(12) United States Patent
Klingerman

(10) Patent No.: US 11,161,482 B1
(45) Date of Patent: Nov. 2, 2021

(54) AIR INFLATION TOOL

(71) Applicant: Jeffrey Klingerman, Overland, MO (US)

(72) Inventor: Jeffrey Klingerman, Overland, MO (US)

( * ) Notice: Subject to any disclaimer, the term of this patent is extended or adjusted under 35 U.S.C. 154(b) by 0 days.

(21) Appl. No.: 17/123,744

(22) Filed: Dec. 16, 2020

(51) Int. Cl.
*B60S 5/04* (2006.01)
*F04B 49/02* (2006.01)
*G01L 17/00* (2006.01)

(52) U.S. Cl.
CPC ............ *B60S 5/046* (2013.01); *F04B 49/022* (2013.01); *G01L 17/00* (2013.01)

(58) Field of Classification Search
CPC .. B60S 5/04; B60S 5/043; B60S 5/046; F04B 49/022; G01L 17/00
See application file for complete search history.

(56) References Cited

U.S. PATENT DOCUMENTS

| | | | | |
|---|---|---|---|---|
| 1,699,378 A * | 1/1929 | Smith | ................... | B60S 5/043 137/226 |
| 2,750,071 A * | 6/1956 | Ritchie | ................... | B60S 5/043 222/3 |
| 4,333,491 A * | 6/1982 | Knubley | ................... | B60S 5/046 137/116.3 |
| 4,969,493 A * | 11/1990 | Lee | ................... | B60S 5/043 137/227 |
| 4,998,438 A * | 3/1991 | Martin | ................... | B60S 5/04 137/228 |
| 5,386,857 A * | 2/1995 | Fogal, Sr. | ................... | B60C 19/00 141/100 |
| 5,429,166 A * | 7/1995 | Anzai | ................... | B60S 5/046 152/415 |
| 5,857,481 A * | 1/1999 | Zimmerman | ................... | B60S 5/043 137/227 |
| 7,430,900 B2 | 10/2008 | Belanger | | |
| 8,191,586 B2 | 6/2012 | Huval | | |
| 8,887,769 B1 * | 11/2014 | Ohm | ................... | F04B 35/06 141/38 |
| 8,925,594 B2 * | 1/2015 | Ohm | ................... | F04B 35/06 141/38 |

* cited by examiner

*Primary Examiner* — Nicolas A Arnett
(74) *Attorney, Agent, or Firm* — Sanchelima & Associates, P.A.; Christian Sanchelima; Jesus Sanchelima

(57) ABSTRACT

A system for an air inflation tool including an air regulator assembly, a clamp assembly, a hose assembly and a housing assembly is disclosed. The air regulator assembly includes an air regulator used to regulate air flow from an air supply. Attached to the air regulator is a clamp from the clamp assembly that permits the air supply to be attached to the air regulator. Attached to an opposite end of the air regulator is an output hose of the hose assembly. The output hose is attached to a tire at an opposite end. When the air regulator determines that the air pressure of the tire is too low, the air regulator will permit for air to continue flowing to the tire through the outlet hose. Otherwise, air flow from the air supply will cease when the air pressure of the tire is as needed.

20 Claims, 5 Drawing Sheets

AIR INFLATION TOOL

BACKGROUND OF THE INVENTION

1. Field of the Invention

The present invention relates to an air inflation tool and, more particularly, to an air inflation tool that automatically prevents air to continue flowing from an air supply once a pre-selected tire pressure level has been achieved.

2. Description of the Related Art

Several designs for air inflation tools have been designed in the past. None of them, however, include a first clamp for connecting an existing air hose to the device, an air regulator, automatic shut-off features, an air output hose, and a second clamp for securing the air output hose to a tire for adding air.

Applicant believes that a related reference corresponds to U.S. Pat. No. 7,430,900 for an inflation system. Applicant believes that another related reference refers to U.S. Pat. No. 8,191,586 for an automated apparatus and method for tire pressure maintenance. None of these references, however, teach of tool that is retrofitted onto an existing air supply pump and automatically prevents air from continuing to flow into a tire from the air supply pump when a desired air pressure is reached.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide an air inflation tool that that facilitate the process of inflating tires with a proper tire pressure with air from air supply pumps.

It is another object of this invention to provide an air inflation tool that can be retrofitted onto existing air supply pumps.

It is still another object of the present invention to provide an air inflation tool that helps to prevent tires from being overfilled with air to increase the safety of users.

It is also another object of the present invention to provide an air inflation tool that is easy to operate and understand.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
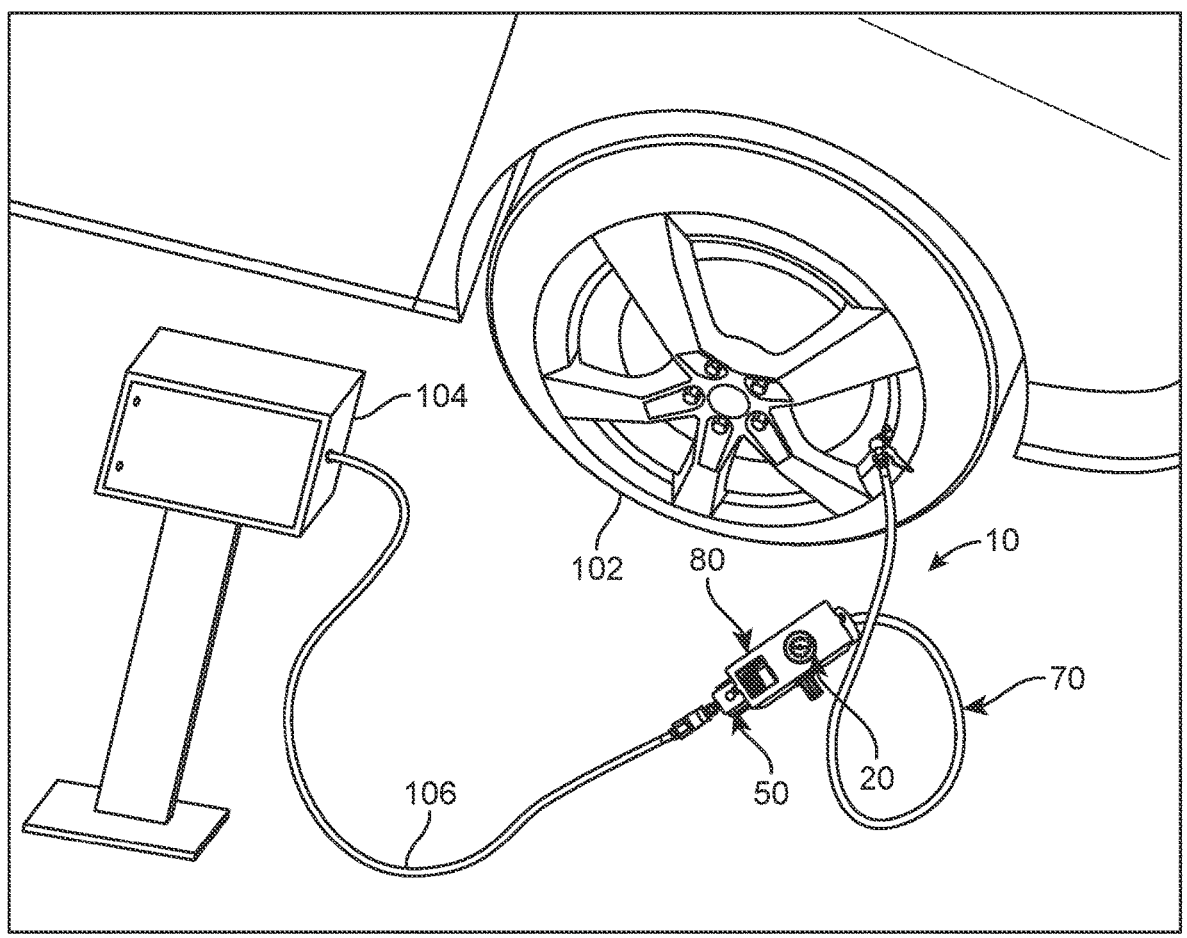
FIG. 1 represents an operational view of air inflation tool 10 in an operational setting being used while air is being pumped into a tire 102 from an air supply 104.

Referring now to the drawings, where the present invention is generally referred to with numeral 10, it can be observed that it, an inflation tool 10, basically includes an air regulator assembly 20, a clamp assembly 50 and a hose assembly 60.

Figure 2:
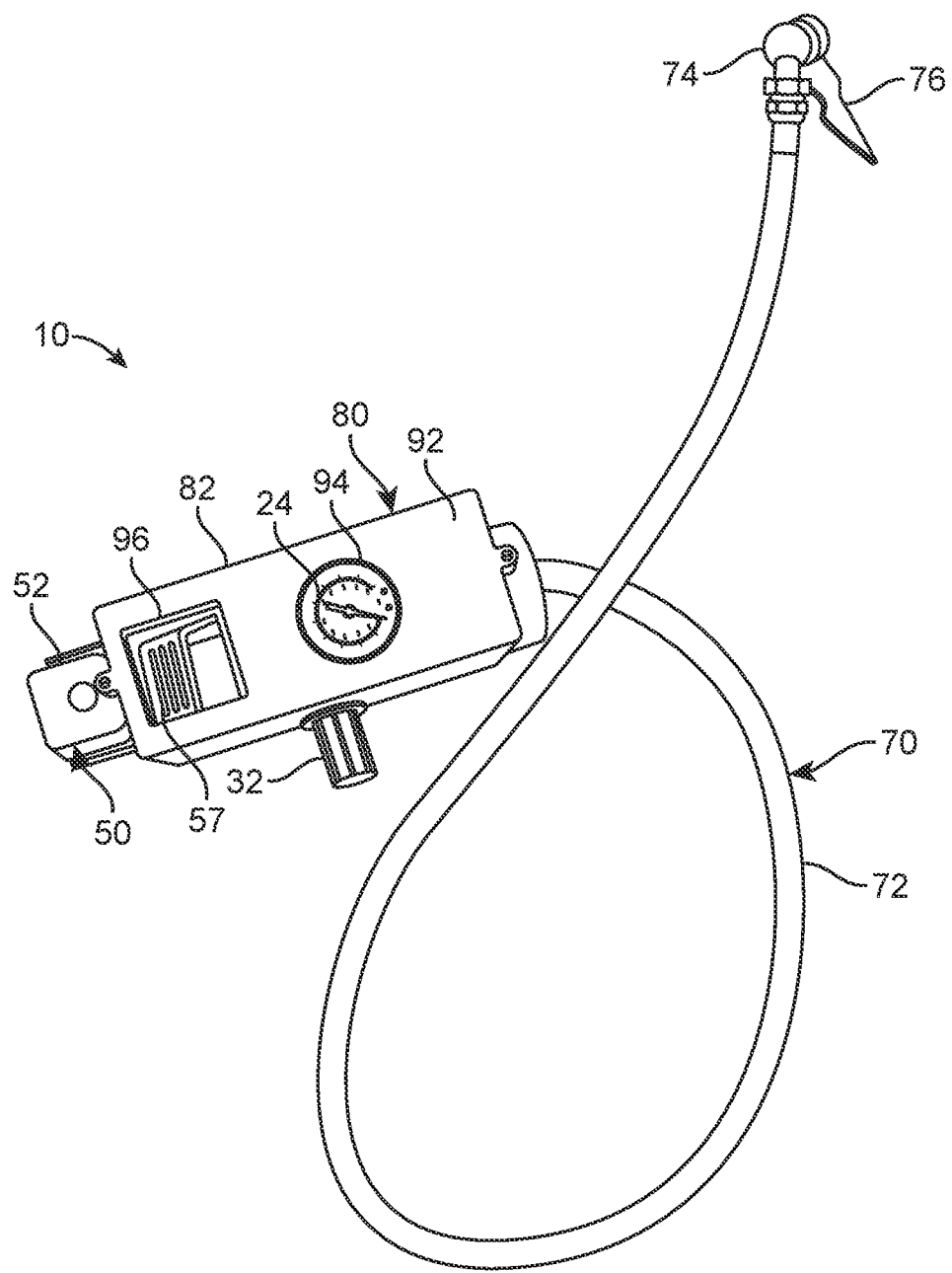
FIG. 2 shows an isometric view of air inflation tool 10.

Air inflation tool 10, as best shown in FIGS. 1-2, may facilitate the process the of filling a tire 102 with a proper air pressure level from air supply 104. Tire 102 may belong to a vehicle. Thereby increasing the safety of users. As an air pressure that is too high or too low may be hazardous. Air inflation tool 10 may have automatic shut off features that stop air from air supply 104 to flow into tire 102 once a pre-determined air pressure is achieved. It is to be understood that air inflation tool 10 may alternatively be referred to as air connector device.

Figure 3:
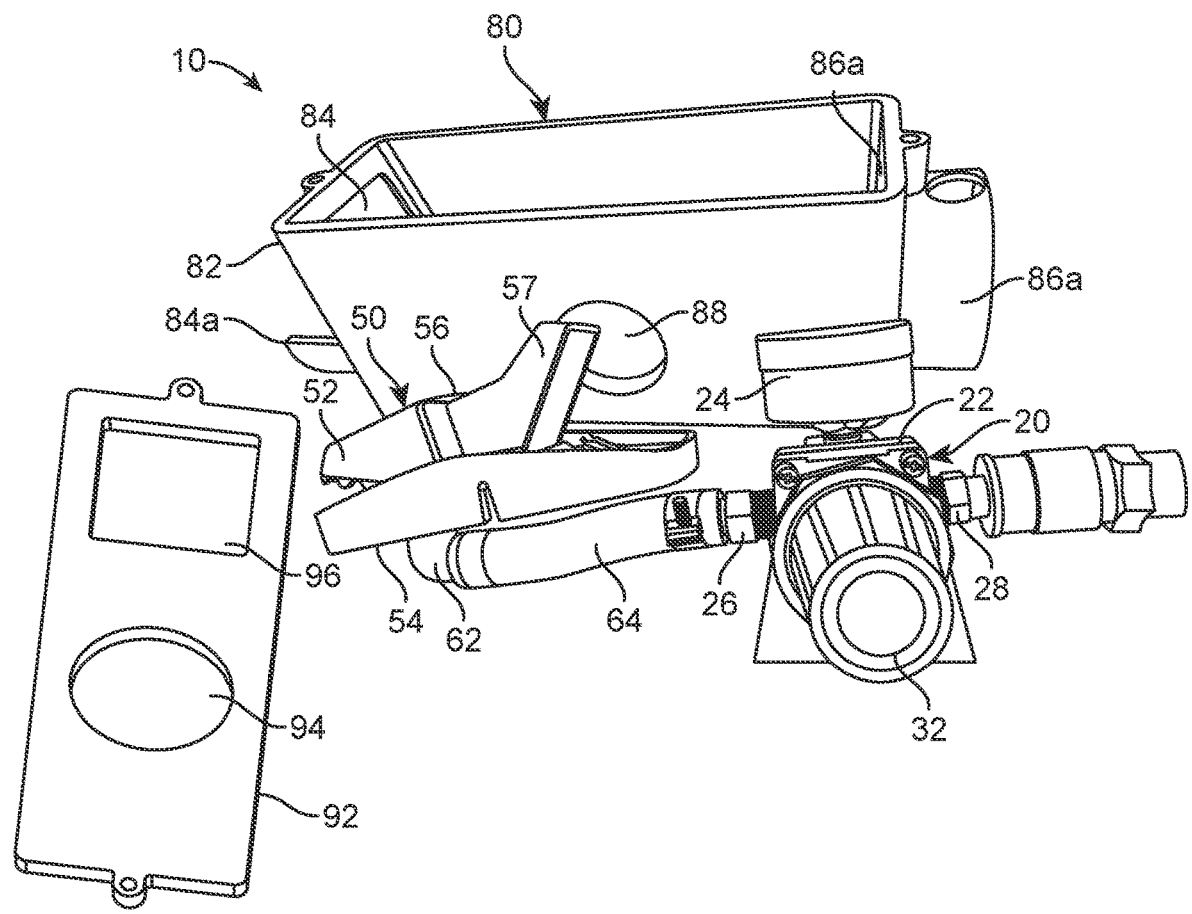
FIG. 3 illustrates a side view of air regulator 22 removed from housing 82.
Figure 4:
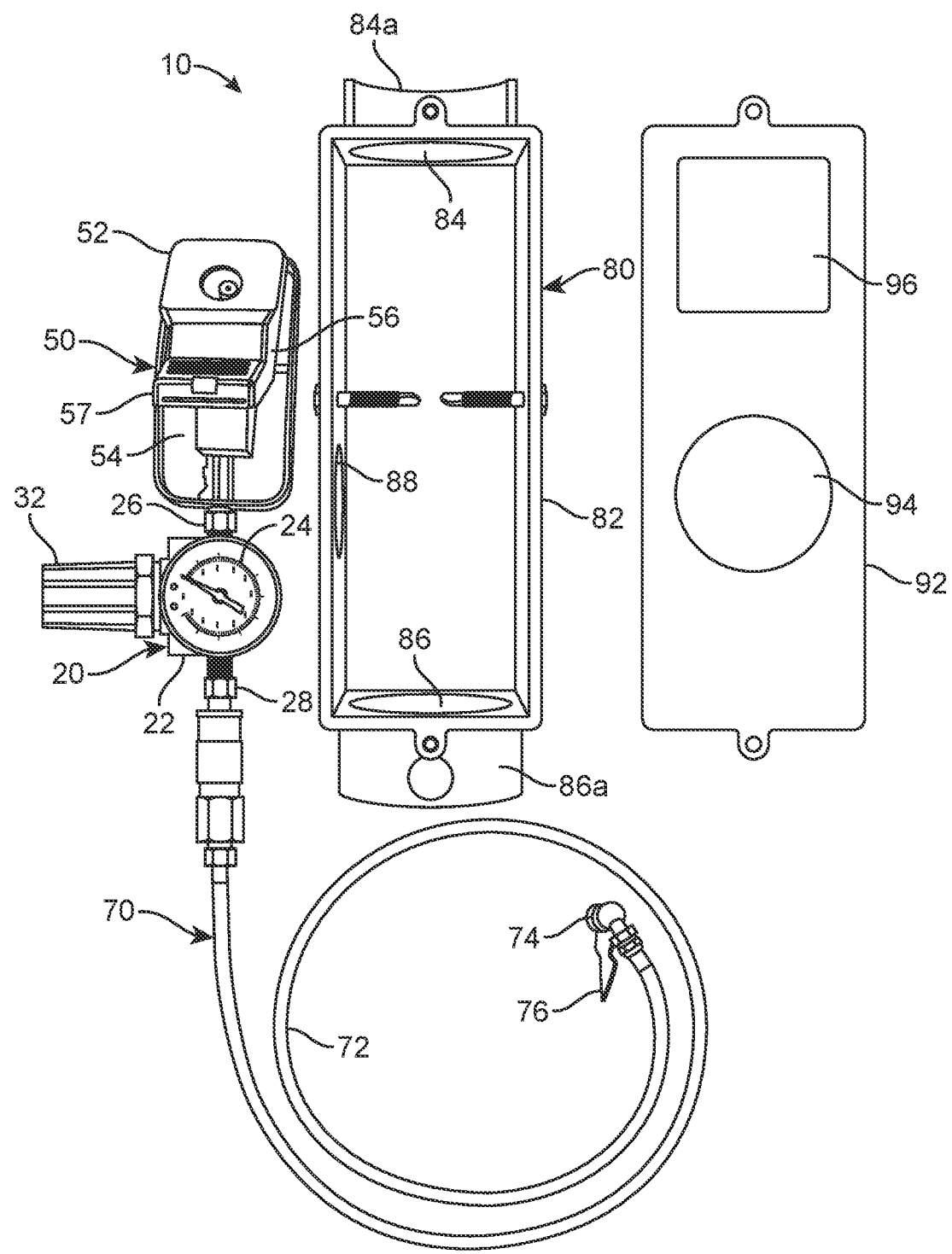
FIG. 4 is a top view of housing 82 and with lid 92 detached and air regulator 22 removed.

Air regulator assembly 20, as best seen in FIGS. 2-3, may include an air regulator 22. Air regulator 22 may be adjusted to prevent air to continue to flow into tire 102. Air regulator 22 may include a pressure gauge 24 attached thereto. Pressure gauge 24 may provide a reading of current air pressure levels of tire 102. It is to be understood that air regulator 22 and pressure gauge 24 may operate in conjunction with one another. Pressure gauge 24 may be attached to a top of air regulator 22. Air regulator 22 may include an inlet 26 and an outlet 28. Air from air supply 104 may flow into air regulator 22 through inlet 26 and out through outlet 28. Air will continue to flow through air regulator 22 when it is determined by pressure gauge 24 that the predetermined air pressure has not yet been achieved. When pressure gauge 24 has determined that the predetermined or desired air pressure level is achieve then air regulator 22 will prevent air to continue to flow out through outlet 28.

Attached to air regulator 22 may be a knob 32. Knob 32 may be used to adjust and select the amount of air or air pressure that will be allowed to flow through air regulator 22. Knob 32 allows users to control and adjust the air pressure that is necessary for tire 102. Once the air pressure has reached the predetermined level selected by knob 32, air regulator 22 will cease the flow of air therethrough. This helps to prevent the overfilling of tire 102 with air, which can be hazardous. The air pressure of tire 102 is easily read with pressure gauge 24.

Figure 5:
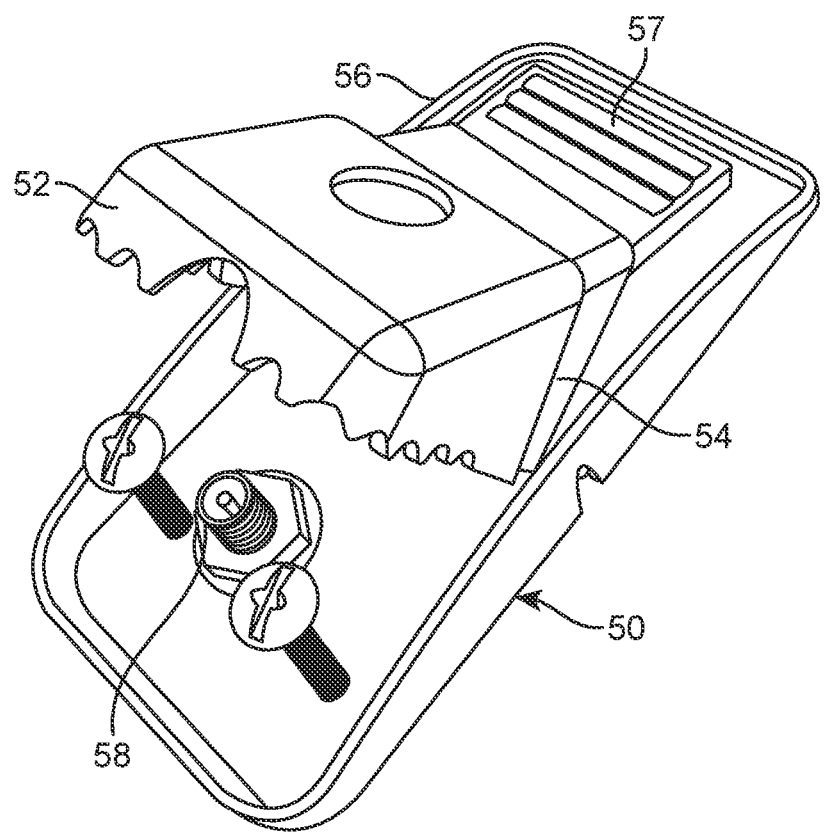
FIG. 5 is a representation of a zoomed in view of clamp assembly 50 opened.

As best seen in FIGS. 1-3, clamp assembly 50 may be attached to air regulator 22. Preferably, clamp assembly 50 may be attached to inlet 26. Clamp assembly 50 may be used to engage air supply 104. More specifically, clamp assembly 50 may cooperate and engage an air supply hose 106 of air supply 104. Clamp assembly 50 may include a clamp 52. Clamp 52 may secure air supply hose 106 to air inflation tool 10. Clamp 52 may be defined by a base 54 and a cover 56 attached thereto. Base 54 may serve as support for air stein 58. Air stein 58 may receive a head of air supply hose 106. Cover 56 may selectively secure air supply hose 106 to clamp 52. Cover 56 may have a closed and opened configuration that is achieved with a clamp lever 57. The opened configuration of clamp 52 may be seen in FIG. 5. Clamp lever 57 may be integral with cover 56. Clamp lever 57 may be actuated to open clamp 52 and more specifically cover 56. Clamp lever 57 may be pressed towards base 54 to open clamp 52.

Air stein 58 which is secured within clamp 52 may receive air supply hose 106 may have a connector 62 attached thereto. Air stein 58 may permit for air from air supply 104 to flow through air inflation tool 10. Connector 62 may be L shaped in one embodiment. Air from air supply 104 flows through air stein 58 and then connector 62 as air makes its way towards air regulator 22. Attached to connector 62 may be a clamp hose 64 at one end. At an opposite end, clamp hose 64 may be attached to inlet 26. Clamp hose 64 may be flexible. Clamp hose 64 may be secured between connector 62 and inlet 26, by a fastening member such as pipe clamps. Thereby allowing for air from air supply 104 to flow into air regulator 22.

As best seen in FIGS. 1-3, hose assembly 70 may be attached to air regulator 22 opposite of clamp assembly 50. Hose assembly 70 may include an output hose 72. Output hose 72 may be secured to outlet 28. Output hose 72 may be used to allow for air from air supply 104 to be delivered to tire 102. Output hose 72 may include an air chuck 74 at a distal end thereof. Air chuck 74 may engage an air stein of tire 102. Thereby allowing for tire 102 to be supplied with air from air supply 104. Additionally, Output hose 72 may include a lever 76. Lever 76 may be used to ensure that air chuck 74 remains attached to tire 102. Lever 76 may be opened and closed to release and engage, respectively, the air stein of tire 102. Lever 76 may be secured to air chuck 74.

It is to be understood that air regulator assembly 20 and clamp support assembly 50 may be preferably be secured within housing assembly 80. Housing assembly 80 may provide protection and support to components of the present invention. Housing assembly 80 may include a housing 82. Housing 82 may be an enclosure. Housing 82 may have a rectangular configuration. Housing 82 may preferably be lightweight. Housing 82 may be made of materials such as plastic, rubber, aluminum, wood, metal or the like. Housing 82 may have an open top face leading to an interior thereof. Housing 82 may include a first opening 84. Clamp assembly 50 may be substantially extend from housing 82 through first opening 84. First opening 84 may be substantially squared, in one embodiment. Adjacent to and in constant abutting contact with first opening 84 may be a first support 84*a*. First support 84*a* may be used to support clamp 52 thereon. First support 84*a* may have a semi-circular configuration, in one embodiment. First support 84*a* may extend outwardly and away from first opening 84.

Opposite to first opening 84 may be a second opening 86. It is to be understood that first opening 84 and second opening 86 may be on opposite distal ends of housing 82. Hose assembly 70 may extend from housing 82 through second opening 86. Second opening 86 may be substantially circular, in one embodiment. Adjacent to and in constant abutting contact with second opening 86 may be a second support 86*a*. Second support 86*a* may be used to hose assembly 70 partially thereon. Second support 86*a* may have a circular configuration, in one embodiment. Second support 86*a* may extend outwardly and away from second opening 86.

Along a sidewall of housing 82 may be a knob opening 88 to allow knob 32 to extend out from. Knob opening 88 may be of a shape that cooperates with knob 32. It is to be understood that between first opening 84 and second opening 86 may be secured air regulator assembly 20 within housing 22. Knob 32 may extend outwardly from housing 82 through knob opening 88 when air regulator assembly 20 is secured within housing 82.

When air regulator 22 has been secured within housing 82, a lid 92 may be used to cover housing 82. Lid 92 may be removeable from housing 82. Lid 92 may be secured to housing 82 with fasteners such as screws, in one embodiment. It is to be understood that nails, snap buttons, hook and loop fasteners, or adhesives may be suitable to secure lid 92 to housing 82. Lid 92 may have a rectangular configuration that cooperates with housing 82. Lid 92 may include a first lid opening 94 and a second lid opening 96. First lid opening 94 allows for viewing of pressure gauge 24 through lid 92. Thereby allowing users to view and determine when the necessary pressure has been achieved. Second lid opening 96 may allow for clamp 52 to be actuated while secured to housing 82. It may be possible for clamp 52 to be opened through second lid opening 96.

With air inflation tool 10 filling tire 102 with air is more efficient. Additionally, air inflation tool 10 ensures that tire 102 is filled with the proper air pressure. Thereby helping users to remain safer on the road. There is no need to guess the air pressure, as the necessary reading is readily available to the users.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for an air inflation tool, comprising:
   a) an air supply having an air supply hose attached thereto;
   b) a tire needing air;
   c) an air regulator assembly including an air regulator with an inlet and an outlet;
   d) a clamp assembly including a clamp, said clamp secured to said inlet, said clamp including an air stein within, said air supply hose secured to said air stein to allow air to flow therefrom;
   e) a hose assembly including an output hose secured to said outlet, said output hose secured to said tire to fill said tire with air from said air supply to achieve a desired air pressure for said tire.

2. The system of claim 1, wherein attached to said air regulator is a pressure gauge, said pressure gauge providing an air pressure reading of said tire.

3. The system of claim 2, wherein a knob is attached to said air regulator, said knob controlling and manipulating air pressure to be permitted to flow through air regulator to said tire.

4. The system of claim 3, wherein said air regulator is secured within a housing.

5. The system of claim 4, wherein said clamp is secured to said housing at a first opening.

6. The system of claim 5, wherein said clamp is supported and attached to said housing with a first support.

7. The system of claim 6, wherein said first support is semi-circular and extends outwardly and away from said housing.

8. The system of claim 5, wherein said output house is secured to said housing at a second opening, said first opening and said second opening being at opposite ends of said housing.

9. The system of claim 8, wherein said output hose is supported and attached to said housing with a second support.

10. The system of claim 9, wherein said second support is circular and extends outwardly and away from said housing.

11. The system of claim 4, wherein said housing includes a knob opening along a sidewall thereof, said knob protruding from said housing through said knob opening.

12. The system of claim 4, wherein said housing includes a lid to conceal said air regulator within said housing, said lid being detachable from said housing.

13. The system of claim 12, wherein said lid includes a first lid opening and a second lid opening, said pressure gauge being visible through said first lid opening, said clamp being visible and actuated through said second lid opening.

14. The system of claim 1, wherein said clamp is defined by a base and a cover.

15. The system of claim 14, wherein said air stein is secured to said base, said cover selectively concealing said air stein.

16. The system of claim 14, wherein attached to said cover is a clamp lever, said clamp lever being actuated to achieve an open configuration of said clamp, said clamp lever released to achieve a closed configuration of said clamp.

17. The system of claim 1, wherein attached to said air stein is a connector, said connector being L shaped.

18. The system of claim 17, wherein attached to said connector is a clamp hose which interconnects said air stein to said inlet of said air regulator.

19. The system of claim 1, wherein said output hose includes an air chuck at a distal end to engage said tire.

20. The system of claim 19, wherein attached to said air chuck is a lever, said lever actuated to secure or release said air chuck from said tire.

* * * * *